(12) United States Patent
Park et al.

(10) Patent No.: US 8,670,098 B2
(45) Date of Patent: Mar. 11, 2014

(54) LIQUID CRYSTAL DISPLAY PANEL AND MANUFACTURING METHOD OF THE SAME

(75) Inventors: Daelim Park, Chilgok-gun (KR); Boyoung Jung, Anseong-si (KR); Inho Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1360 days.

(21) Appl. No.: 11/960,325

(22) Filed: Dec. 19, 2007

(65) Prior Publication Data

US 2008/0158457 A1 Jul. 3, 2008

(30) Foreign Application Priority Data

Dec. 29, 2006 (KR) .......................... 10-2006-0137517

(51) Int. Cl.
*G02F 1/1343* (2006.01)

(52) U.S. Cl.
USPC .......................................... 349/141; 349/38

(58) Field of Classification Search
USPC ..................................... 349/141, 143, 38–39
See application file for complete search history.

(56) References Cited

U.S. PATENT DOCUMENTS

| | | | |
|---|---|---|---|
| 6,449,026 B1 | 9/2002 | Min et al. | |
| 7,397,519 B2 * | 7/2008 | Jeong et al. | 349/43 |
| 7,605,898 B2 * | 10/2009 | Ochiai et al. | 349/143 |
| 8,314,762 B2 * | 11/2012 | Park | 345/87 |
| 2004/0109121 A1 * | 6/2004 | Cho et al. | 349/141 |
| 2004/0125306 A1 * | 7/2004 | Kim | 349/141 |
| 2005/0041182 A1 | 2/2005 | Ono et al. | |
| 2005/0110930 A1 | 5/2005 | Kim | |
| 2005/0110932 A1 * | 5/2005 | Chang et al. | 349/141 |
| 2006/0146245 A1 | 7/2006 | Ahn et al. | |
| 2006/0146255 A1 | 7/2006 | Ahn | |

FOREIGN PATENT DOCUMENTS

| | | | |
|---|---|---|---|
| KR | 1020020041426 A | 6/2002 | |
| KR | 1020020069168 A | 8/2002 | |
| KR | 1020040050624 A | 6/2004 | |
| KR | 1020060079040 A | 7/2006 | |
| TW | 575775 B | 2/2004 | |

OTHER PUBLICATIONS

Office Action issued in corresponding European Patent Application No. 07 122 936.3; issued Oct. 22, 2008.
Office Action issued in corresponding European Patent Application No. 07122936.3, mailed Dec. 27, 2010.
European Search Report issued in corresponding European Patent Application No. 07122936.3; mailed Apr. 17, 2008.
Office Action issued in corresponding Taiwan Patent Application No. 096148092, mailed Oct. 6, 2011.
Office Action issued in corresponding Korean Patent Application No. 10-2006-0137517, mailed Jun. 27, 2013, 6 pages.

* cited by examiner

*Primary Examiner* — Dung Nguyen
(74) *Attorney, Agent, or Firm* — Brinks Gilson & Lione

(57) ABSTRACT

A fringe field type liquid crystal display panel that increases an aperture ratio of a pixel area includes: a gate line disposed on a substrate; a data line disposed to cross the gate line, wherein a gate insulating film is disposed the gate line and the data line; a thin film transistor disposed at an intersection area of the gate line and the data line; a pixel electrode disposed on the gate insulating film and directly connected to the thin film transistor; a passivation film disposed on the gate insulating film to cover the pixel electrode and the thin film transistor; and a common electrode disposed to overlap the pixel electrode and the data line on the passivation film to form a fringe field for aligning liquid crystal together with the pixel electrode.

45 Claims, 22 Drawing Sheets

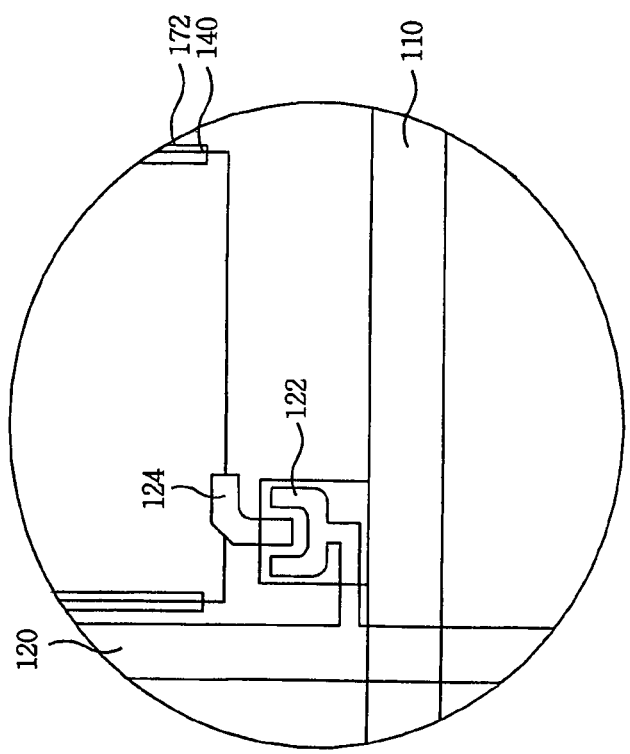

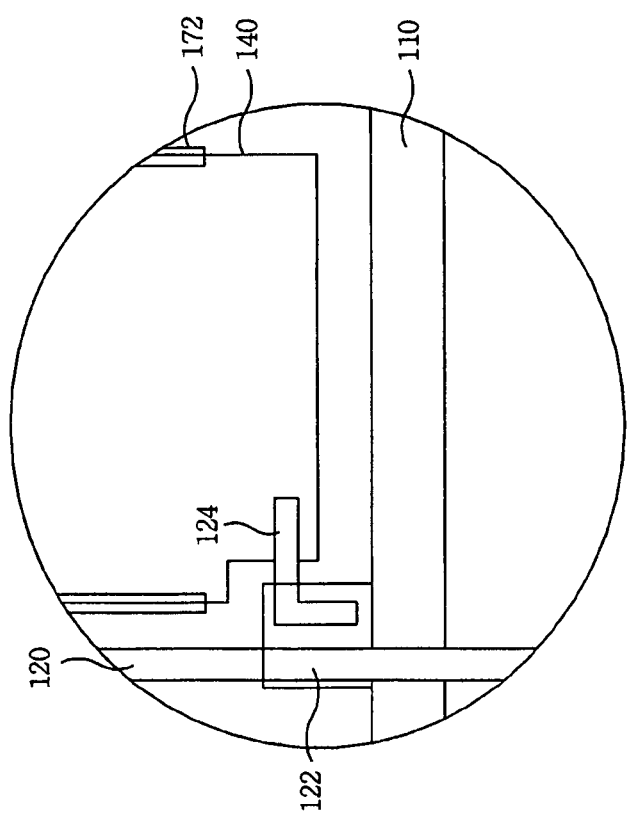

LIQUID CRYSTAL DISPLAY PANEL AND MANUFACTURING METHOD OF THE SAME

CLAIM OF PRIORITY

This application claims the benefit of the Korean Patent Application No. P2006-0137517 filed on Dec. 29, 2006, which is hereby incorporated by reference.

BACKGROUND

1. Technical Field

The present disclosure relates to a fringe field type flat panel display panel and a fabricating method thereof, and more particularly to a fringe field type liquid crystal display panel and a fabricating method thereof that is adaptive for increasing an aperture ratio of a pixel area by forming a common electrode to be overlapped with a data line.

2. Description of the Related Art

A liquid crystal display panel controls the light transmittance of liquid crystal by use of electric field, thereby displaying a picture. The liquid crystal display panel is broadly classified into a vertical electric field applying type and a horizontal electric field applying type in accordance with the direction of the electric field which drives the liquid crystal.

The vertical electric field applying type liquid crystal display panel drives a liquid crystal of a twisted nematic (hereinafter, referred to as "TN") mode by a vertical electric field formed between a common electrode and a pixel electrode which are arranged to face each other in upper and lower substrates. The vertical electric field applying type liquid crystal display panel has an advantage in that its aperture ratio is high, but has a disadvantage in that its viewing angle is narrow to be about 90°.

The horizontal electric field applying type liquid crystal display panel drives a liquid crystal of an in-plain switching (hereinafter, referred to as "IPS") mode by a horizontal electric field formed between a common electrode and a pixel electrode which are arranged in parallel in a lower substrate. The horizontal electric field applying type liquid crystal display panel has an advantage in that its viewing angle is broad to be about 160°, but has a disadvantage in that its aperture ratio and transmittance are low.

In order to improve the disadvantage of the horizontal electric field applying type liquid crystal display panel, there is proposed a fringe field switching (hereinafter, referred to as "FFS") type liquid crystal display panel which is driven by a fringe field.

Herein, the FFS type liquid crystal display panel includes a common electrode plate and a pixel electrode with an insulating film therebetween in each pixel area, and forms a gap between the common electrode plate and the pixel electrode to be narrower than the gap between the upper and lower substrates, thereby forming a fringe field for driving liquid crystal molecules filled between the upper and lower substrates.

In case of the FFS type liquid crystal display panel configured, as described above, the fringe field is formed even in a pixel area adjacent to a data line to drive a liquid crystal, thus light leaks out between the data line and the pixel electrode adjacent thereto, i.e., vertical cross talk.

In the related art, in order to address the vertical cross talk, a black matrix or shielding metal for blocking the light leaked between the data line and the pixel electrode is formed, but there is a problem that the light transmittance is deteriorated because the aperture ratio of the pixel area is decreased due to this.

SUMMARY

According to one aspect, a fringe field type liquid crystal display panel is disclosed that includes: a gate line disposed on a substrate; a data line disposed to cross the gate line with a gate insulating film therebetween; a thin film transistor disposed at an intersection area of the gate line and the data line; a pixel electrode disposed on the gate insulating film and directly connected to the thin film transistor; a passivation film disposed on the gate insulating film to cover the pixel electrode and the thin film transistor; and a common electrode disposed to overlap the pixel electrode and the data line on the passivation film to form a fringe field for aligning liquid crystal together with the pixel electrode.

According to another aspect, a method for fabricating a fringe field type liquid crystal display panel includes: forming a gate line on a substrate; forming a data line which crosses the gate line with a gate insulating film therebetween to define a pixel area; forming a thin film transistor at an intersection area of the gate line and the data line; forming a pixel electrode on the gate insulating film to be directly connected to the thin film transistor; forming a passivation film on the gate insulating film to cover the pixel electrode and the thin film transistor; and forming a common electrode to overlap the pixel electrode and the data line on the passivation film and to form a fringe field for aligning liquid crystal together with the pixel electrode.

According to yet another aspect, a method for fabricating a fringe field type liquid crystal display panel includes: forming a first conductive pattern having a gate line, a gate electrode and a gate pad lower electrode, which are connected to the gate line, and the storage electrode on a substrate; forming a pixel electrode which forms a fringe field on the gate insulating film after forming a gate insulating film which covers the substrate where the first conductive pattern is formed; forming a semiconductor layer configured to include an ohmic contact layer and an active layer, which forms a channel on the gate insulating film where the pixel electrode is formed; forming a second conductive pattern having a data line, which crosses the gate line on the gate insulating film to define a pixel area, a source electrode connected to the data line, a drain electrode formed to face the source electrode with a channel therebetween, and a data pad lower electrode, and a semiconductor pattern having the ohmic contact layer and the active layer which forms the channel; forming a passivation film to cover the insulating film where the semiconductor pattern and the second conductive pattern are formed; and forming a common electrode to overlap the pixel electrode and the data line on the passivation film and to form a fringe field.

Additional advantages, objects, and features of the disclosure will be set forth in part in the description which follows and will become apparent to those having ordinary skill in the art upon examination of the following or may be learned from practicing the invention. The objectives and other advantages of the disclosure may be realized and attained by the structure particularly pointed out in the written description and claims thereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the invention.

FIGS. 3A and 3B are configurational plan views of a thin film transistor formed in a fringe field type liquid crystal display panel according to the present disclosure.

DETAILED DESCRIPTION

Figure 1:
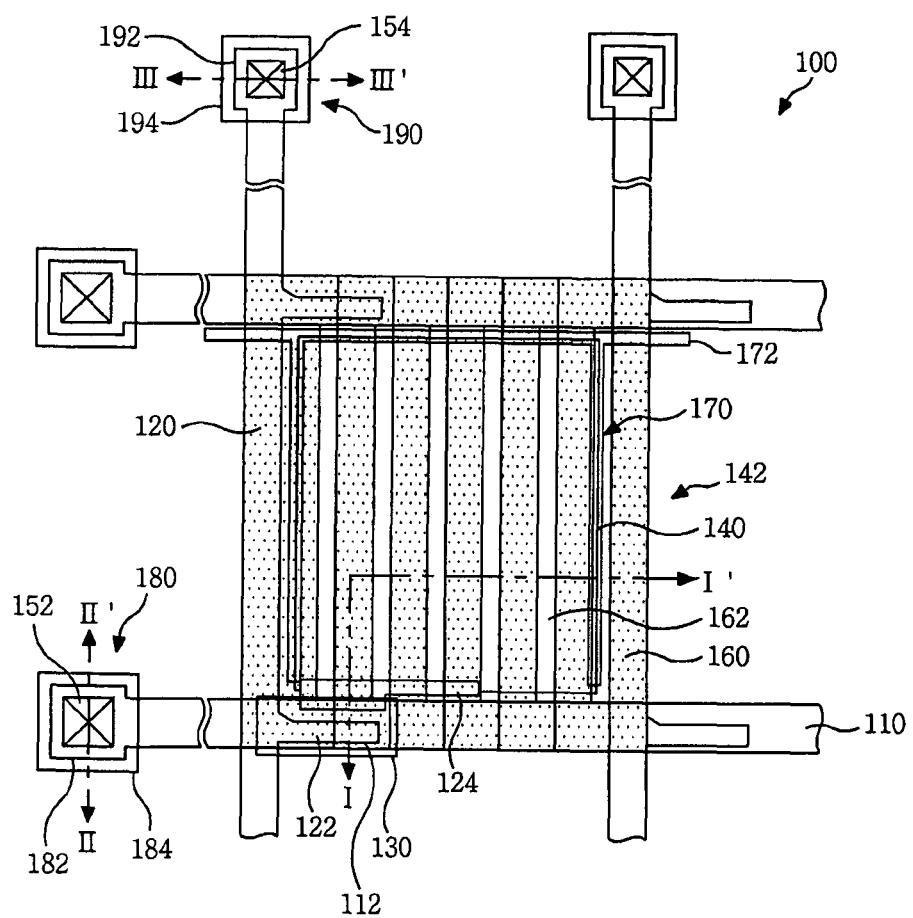
FIG. 1 is a plan view of a fringe field type flat panel display panel according to the present disclosure.
Figure 2:
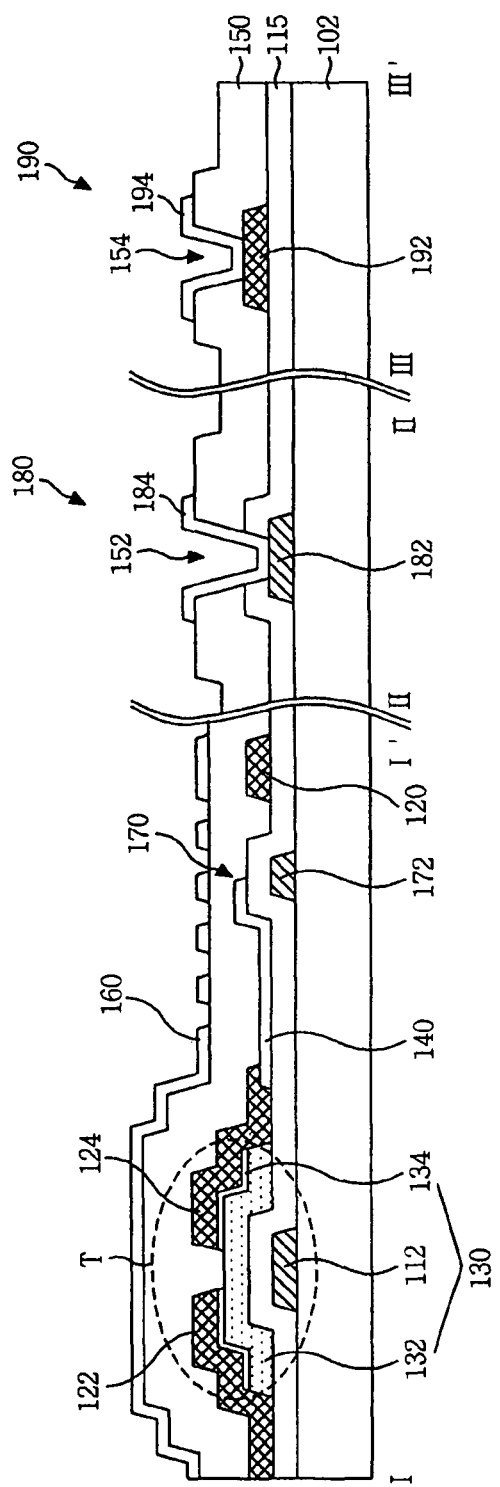
FIG. 2 is a configurational sectional view of a fringe field type flat panel display panel according to the present disclosure.

FIGS. 1 and 2 depict a fringe field type liquid crystal display panel 100 according to the present disclosure that includes a gate line 110 formed on a substrate 102; a data line 120 formed to cross a gate line 110 with a gate insulating film 115 therebetween to define a pixel area 142; a thin film transistor T formed at a crossing area of the gate line 110 and the data line 120; a pixel electrode 140 formed on the gate insulating film 115 to be directly connected to the thin film transistor T; a passivation film 150 for covering the thin film transistor T; and a common electrode formed to overlap the pixel electrode 140 on the passivation film 150, thereby forming a fringe field.

Herein, the fringe field type liquid crystal display panel 100 further includes a storage capacitor 170 composed of a storage electrode 172 formed of the same material and simultaneously as the gate line 110 and a pixel electrode 140 formed to overlap the storage electrode 172 with the gate insulating film 115.

Further, the fringe field type liquid crystal display panel 100 includes a gate pad 180 connected to the gate line 110 and a data pad 190 connected to the gate line 120. The gate line 110 transmits gate signals, which are supplied from a gate driver (not shown) connected to the gate pad 180, to the gate electrode 112 of the thin film transistor T. Herein, the gate line 110 and the gate electrode 112 are formed of a gate metal such as aluminum Al group metal, copper Cu, chrome Cr, molybdenum Mo, and the like.

The data line 120 acts to transmit data signals, which are supplied from a data driver (not shown) connected to the data pad 190, to the source electrode 132 and the drain electrode 134 of the thin film transistor T in interlock with the on/off of the gate electrode 112. The data line 120 crosses the gate line 110 with the gate insulating film 115 to define a pixel area where the pixel electrode 140 is located.

The thin film transistor T acts to charge the pixel electrode 140 with pixel signals of the data line 120 in response to the gate signals of the gate line 110. The thin film transistor T is configured to include a gate electrode 112 connected to the gate line 110; a source electrode 122 connected to the data line 120 which is formed to cross the gate line 110 with the gate insulating film 115; and a drain electrode 124 which is formed to face the source electrode 122 with a channel therebetween and is connected to the pixel electrode 140 in an overlapping shape.

Further, the thin film transistor T is configured to further include a semiconductor pattern composed of an active layer 132 formed to correspond to the gate electrode with the gate insulating film 115 therebetween to form a channel and an ohmic contact layer 134 formed on the active layer 132 to be in ohmic-contact with the source electrode 122 and the drain electrode 124.

Herein, the thin film transistor includes the source electrode projected from the data line and the drain electrode of a "г" shape that faces the source electrode with the channel therebetween and that is directly connected to the pixel electrode at the same time.

That is to say, as the drain electrode 124 of the thin film transistor T is formed in the "г" shape to partially overlap the pixel electrode 140, the aperture ratio of the pixel area 140 is conspicuously increased in comparison with the thin film transistor of the related art having a structure of being projected from the pixel area.

Figure 3A:
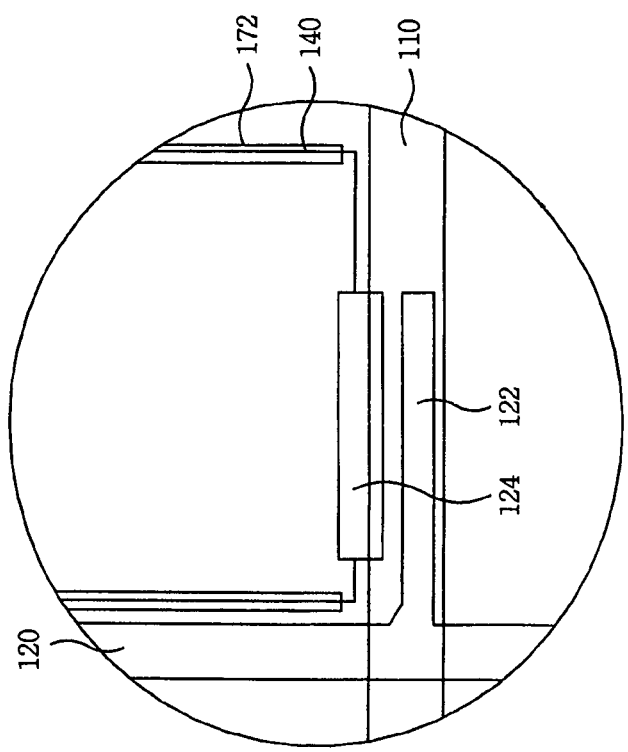

The thin film transistor T, as shown in FIG. 3A, may include the source electrode 122 projected from the data line 120 and the drain electrode 124 of a "−" shape that faces the source electrode 122 with the channel therebetween and that is directly connected to the pixel electrode 140 at the same time. A "−" shaped channel is formed between the source electrode 122 and the drain electrode 124.

The thin film transistor T, as shown in FIG. 3B, may include the source electrode 122 of a "U" shape projected from the data line 120 and the drain electrode 124 which faces the source electrode 122 with the channel therebetween and that is directly connected to the pixel electrode 140 at the same time. A "U" shaped channel is formed between the source electrode 122 and the drain electrode 124.

The thin film transistor T, as shown in FIG. 3C, may include the source electrode 122 formed to be integrated with the data line 120 and the drain electrode 124 of a "г" shape that faces the source electrode 122 with the channel therebetween and that is directly connected to the pixel electrode 140 at the same time.

The pixel electrode 140 forms a fringe field for aligning liquid crystal in a slit groove 162 formed in the common electrode 160 in case the pixel signals are supplied through the thin film transistor T. The pixel electrode 140 is thus configured to be directly connected to the drain electrode 124 of the thin film transistor T. Herein, the pixel electrode 140 is formed of a transparent conductive material such as ITO and the like, and is formed with a gap of about 0-3.0 μm from the data line 120 in a pixel area. Accordingly, there is no need of forming a margin to form a contact hole connecting the pixel electrode 140 and the drain electrode 124 in a pixel area 142, and the aperture ratio of the pixel area 142 is increased thereby.

The passivation film 150 is formed to have a designated thickness on the gate insulating film 115 where the thin film transistor T and the pixel electrode 140 are formed, and acts to protect the active layer 132 forming a channel from moisture, scratching or the like. The passivation film 150 is formed of an inorganic insulating material such as silicon nitride, and the like, or an organic insulating material such as BCB (benzocyclobutene), PFCB (perfluorocyclobutane), or an organic compound material such as photo-acryl.

In case the passivation film 150 is formed of the inorganic insulating material such as silicon nitride (dielectric constant of about 6.5), it is desired that the passivation film 150 have a thickness of not less than 6000 Å in order to prevent a coupling from being generated between the data line 120 and the common electrode 160 that overlaps the data line 120 with the passivation film 150 therebetween.

And, in case the passivation film 150 is formed of the organic compound material such as photo-acryl (dielectric constant of about 3.3), it is desired that the passivation film 150 have a thickness of not less than 1.5 μm in order to prevent a coupling from being generated between the data line 120 and the common electrode 160 that mutually overlapped.

The passivation film 150 includes first and second contact holes 152 and 154 formed by a mask process. Herein, the first open hole 152 penetrates the passivation film 150 and the gate insulating film 115 to open a gate pad lower electrode 182, and the second open hole 154 penetrates the passivation film 170 to open a data pad lower electrode 192.

The common electrode 160 is formed in the pixel area in a shape of overlapping the pixel electrode 140 with the passivation film 150 therebetween, and forms a fringe field for driving the liquid crystal aligned in the pixel area in a designated direction together with the pixel electrode 140. The common electrode is formed of a transparent conductive material such as ITO, IZO or the like. In other words, if a reference voltage is applied through a common line, there is formed a fringe field for aligning liquid crystal between the pixel electrode 140 and the slit groove 162 formed in the common electrode 160.

The common electrode 160 can be formed to match with the data line 120 as the passivation film 150 is formed at a height that can prevent the coupling from being generated, thus the aperture ratio of the pixel area 142 is increased to raise the transmittance as a consequence.

Herein, the common electrode 160 is formed on a channel area of the thin film transistor T, and also acts to prevent the leakage current and off-current flowing in the channel area from being generated.

The storage capacitor 170 is configured to include a storage electrode 172 simultaneously formed of the same material as the gate line 110 and a pixel electrode 140 formed to partially overlap the storage electrode 172 with the gate insulating film 115 therebetween.

The gate pad 180 is connected to the gate driver (not shown) to supply gate signals to the gate line 110, and is configured to include a gate pad lower electrode 182 extended from the gate line 110 and a gate pad upper electrode 184 connected to the gate pad lower electrode 182 through a first contact hole 152 that penetrates the passivation film 150 and the gate insulating film 115.

The gate pad lower electrode 182 constituting the gate pad 180 is formed of the same material as the gate line, and the gate pad upper electrode 182 is formed of the same material as the common electrode 160.

The data pad 190 is connected to the data driver (not shown) to supply data signals to the data line 120, and is configured to include a data pad lower electrode 192 extended from the data line 120 and a data pad upper electrode 194 connected to the data pad lower electrode 192 through a second contact hole that penetrates the passivation film 150.

The data pad lower electrode 192 constituting the data pad 190 is formed of the same material as the data line, and the data pad upper electrode 194 is formed of the same material as the common electrode 160 at the same time.

Hereinafter, a fabricating method of a fringe field type liquid crystal display panel 100 will be explained.

Figure 4A:
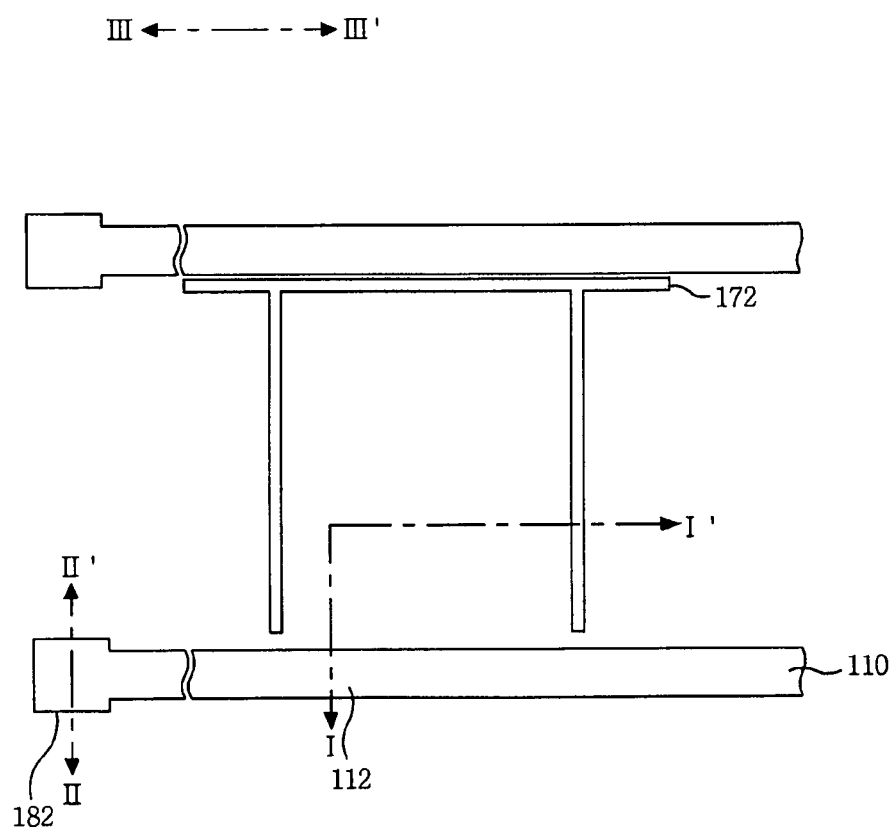
FIGS. 4A and 4B are a plan view and a cross sectional view of a flat panel display panel where a first conductive pattern is formed according to the present disclosure.
Figure 4B:
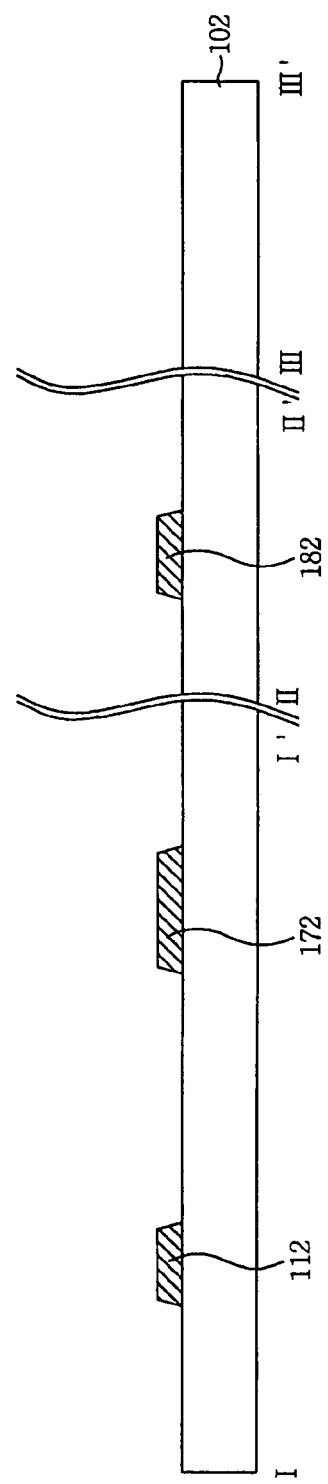

First of all, a first mask process according to the present disclosure is carried out to form a first conductive pattern inclusive of the gate line 110, the gate electrode 112, the storage electrode 172 and the gate pad lower electrode 182 on the substrate 102, as shown in FIGS. 4A and 4B.

More specifically, a gate metal layer is deposited on the entire surface of the substrate 102 by a deposition process of sputtering or by a similar process. Herein, the gate metal layer is formed of aluminum Al group metal, copper Cu, chrome Cr, molybdenum Mo and the like.

A photolithography using a first mask is carried out after a photo-resist is spread over the entire surface of the substrate 102, thereby forming a photo-resist pattern (RP) that exposes the gate metal layer. The gate metal layer exposed by the photo-resist pattern PR is removed by a wet etching, and then a remaining photo-resist pattern is ashed to form the first conductive pattern inclusive of the gate line 110, the gate electrode 112 formed to be integrated into the gate line 110, the storage electrode 172, and the gate pad lower electrode 182 on the substrate 102.

Figure 5A:
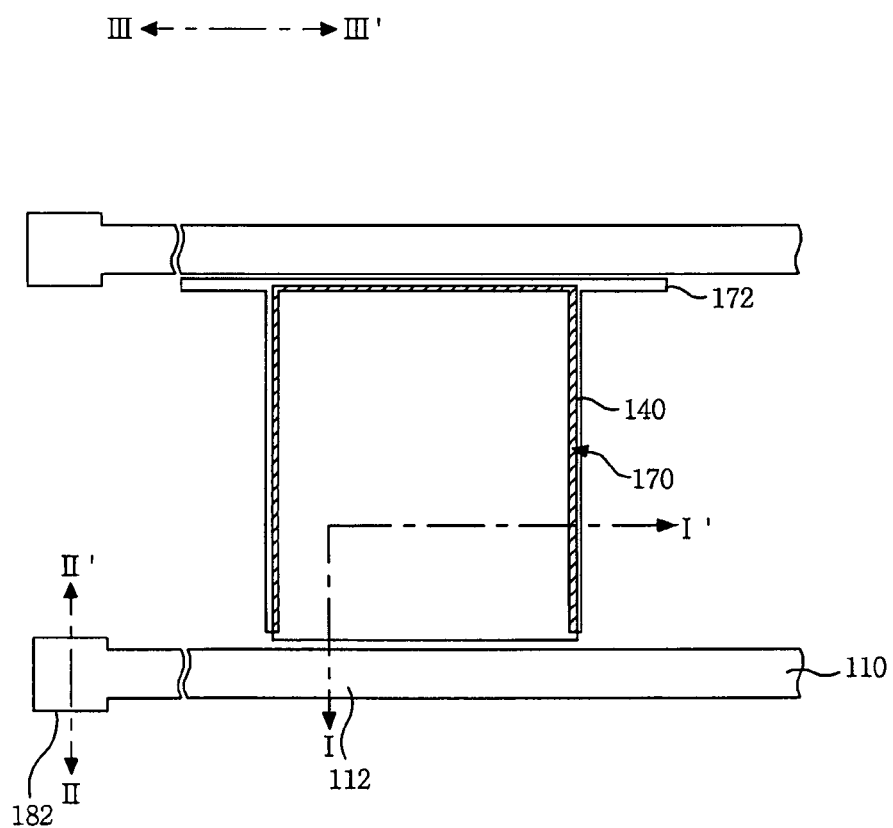
FIGS. 5A and 5B are a plan view and a cross sectional view of a flat panel display panel where a pixel electrode is formed according to the present disclosure.
Figure 5B:
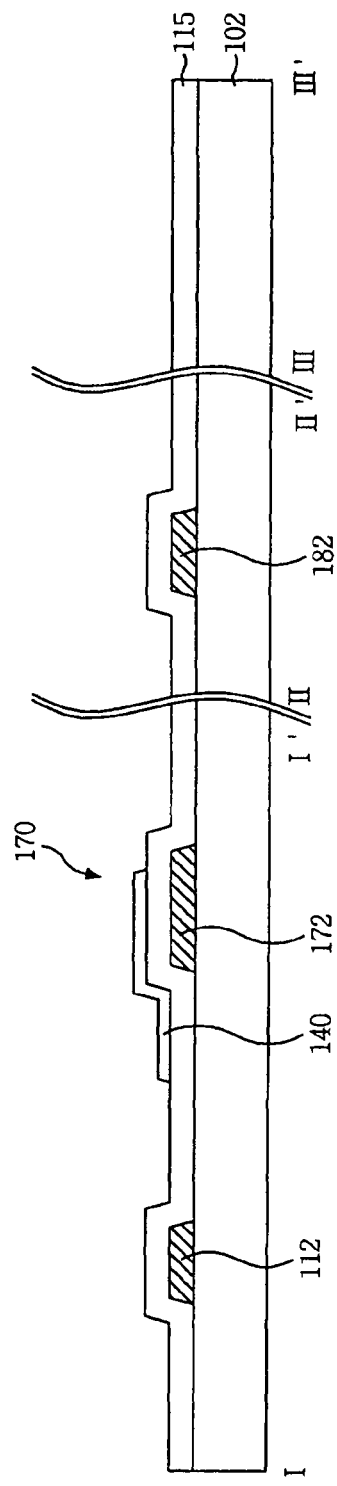

As described above, after forming the first conductive pattern on the substrate, there is formed the pixel electrode 140, which forms the fringe field for aligning liquid crystal, on the gate insulating film by a second mask process according to the present disclosure, as shown in FIGS. 5A and 5B.

To describe this more specifically, the gate insulating film 115 is formed on the substrate where the first conductive pattern is formed, and then a transparent conductive layer is deposited on the entire surface of the gate insulating film 115 by a deposition process such as plasma enhanced chemical vapor deposition (PECVD) and the like.

A photolithography process using a second mask is carried out after a photo-resist is formed on the entire surface of the transparent conductive layer, thereby forming a photo-resist pattern PR that exposes a remaining area except an area where the pixel electrode 140 is to be formed in the transparent conductive layer.

The transparent conductive layer exposed by the photo-resist pattern PR is etched, and then the photo-resist pattern is removed, thereby forming the pixel electrode 140 that forms a fringe field for aligning liquid crystal together with the common electrode 160 in the pixel area 142 of the gate insulating film 115 according to the present disclosure.

Herein, the pixel electrode 140 is formed to partially overlap the storage electrode 172 with the gate insulating film 115 therebetween, thereby forming the storage capacitor 170. Further, the pixel electrode 140 is connected to the drain electrode in a shape of being partially overlapped therewith, thus there is no need of forming a contact hole for exposing the drain electrode 124, thereby increasing the aperture ratio of the pixel area 142.

Figure 6A:
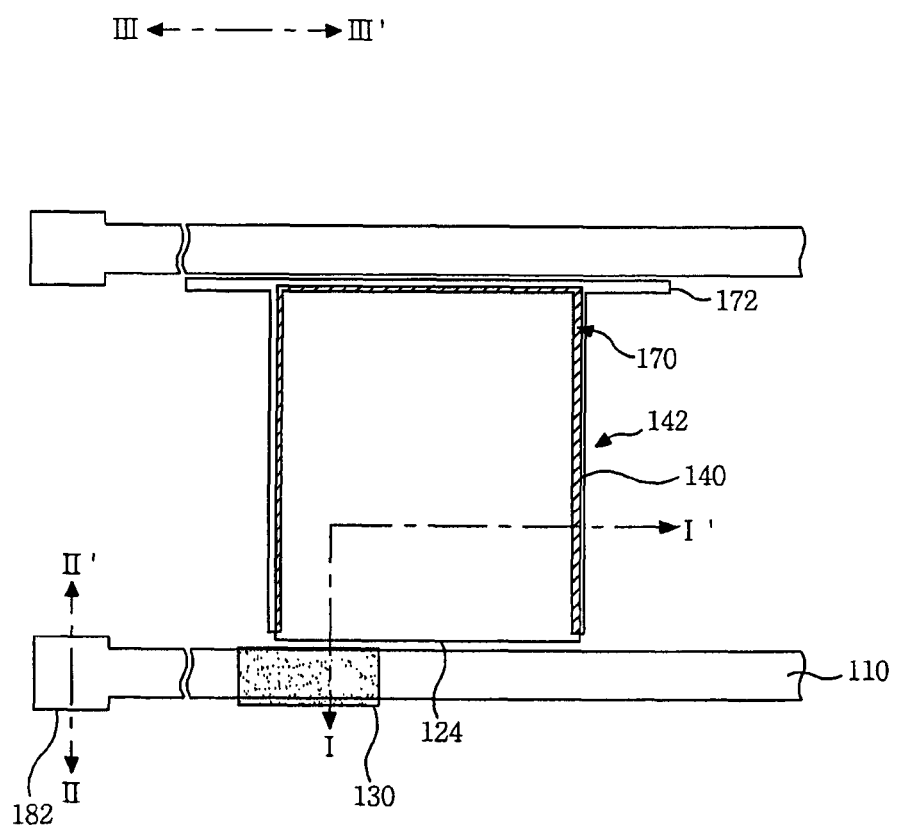
FIGS. 6A and 6B are a plan view and a cross sectional view of a flat panel display panel where a semiconductor layer is formed according to the present disclosure.
Figure 6B:
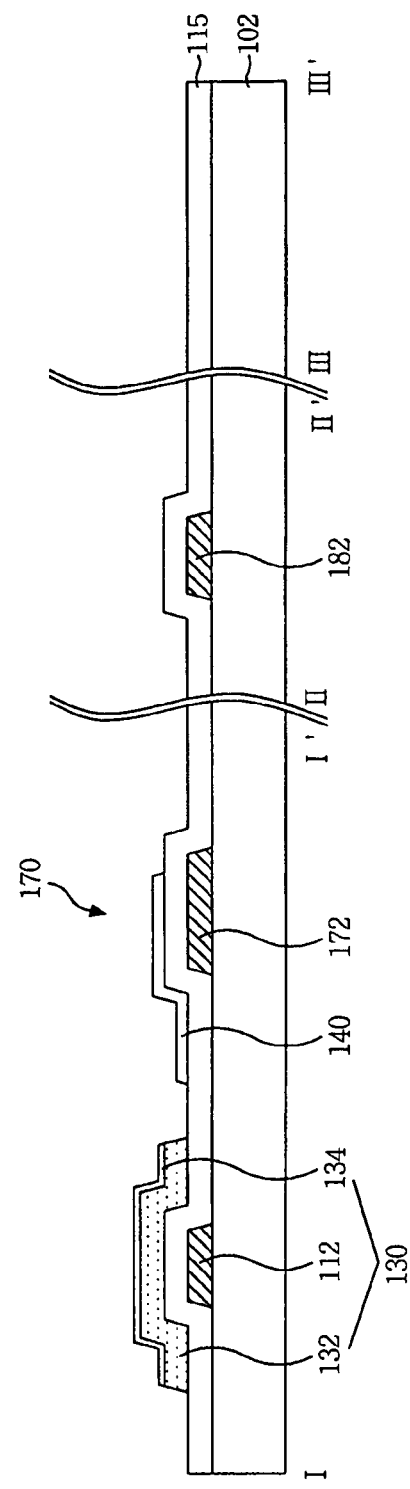

As described above, after forming the pixel electrode on the gate insulating film, there are formed a channel and a semiconductor layer for being in ohmic contact by a third mask process according to the present disclosure, as shown in FIGS. 6A and 6B.

More specifically, the semiconductor layer composed of an a-Si layer and an n+ silicon layer is sequentially formed on the gate insulating film 115 where the pixel electrode 140 is formed. Then, a photolithography process using a third mask is carried out after a photo-resist is spread over the entire surface of the semiconductor layer, thereby forming the photo-resist pattern (PR) that exposes a remaining area except an area corresponding to the channel area in the semiconductor layer.

At this moment, the semiconductor layer exposed by the photo-resist pattern PR is etched, and then the remaining photo-resist pattern PR is removed, thereby forming a semiconductor pattern 130 composed of an active layer 132 forming the channel and an ohmic contact layer 134 for being in ohmic contact according to the present disclosure.

Figure 7A:
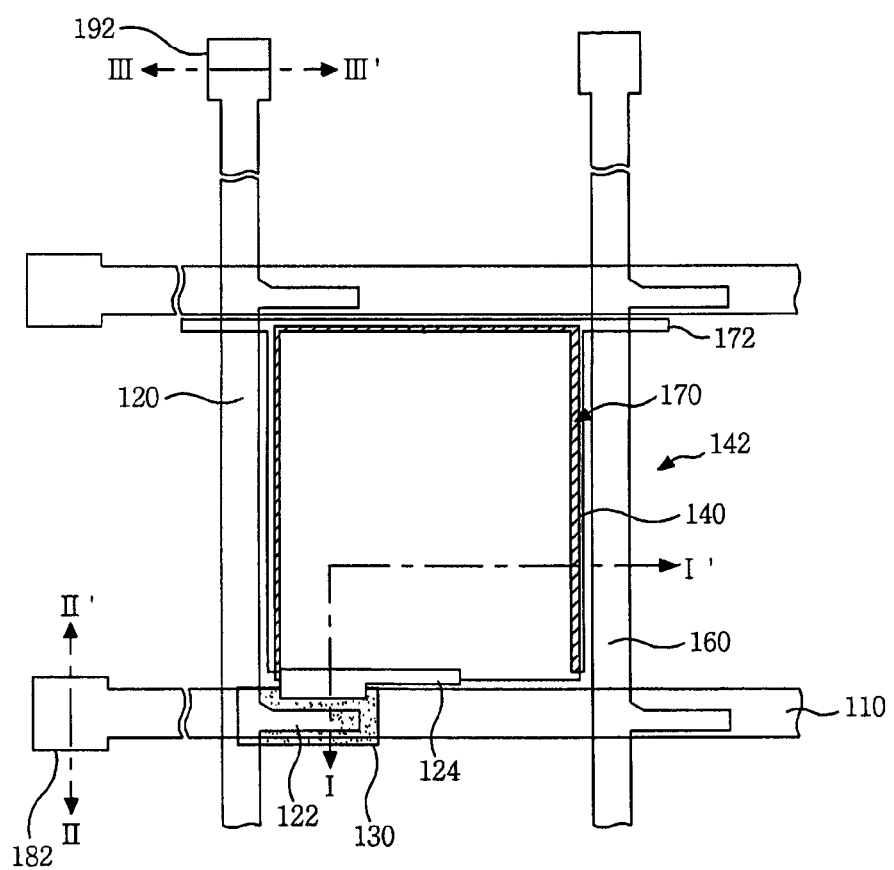
FIGS. 7A and 7B are a plan view and a cross sectional view of a flat panel display panel where a second conductive pattern is formed according to the present disclosure.
Figure 7B:
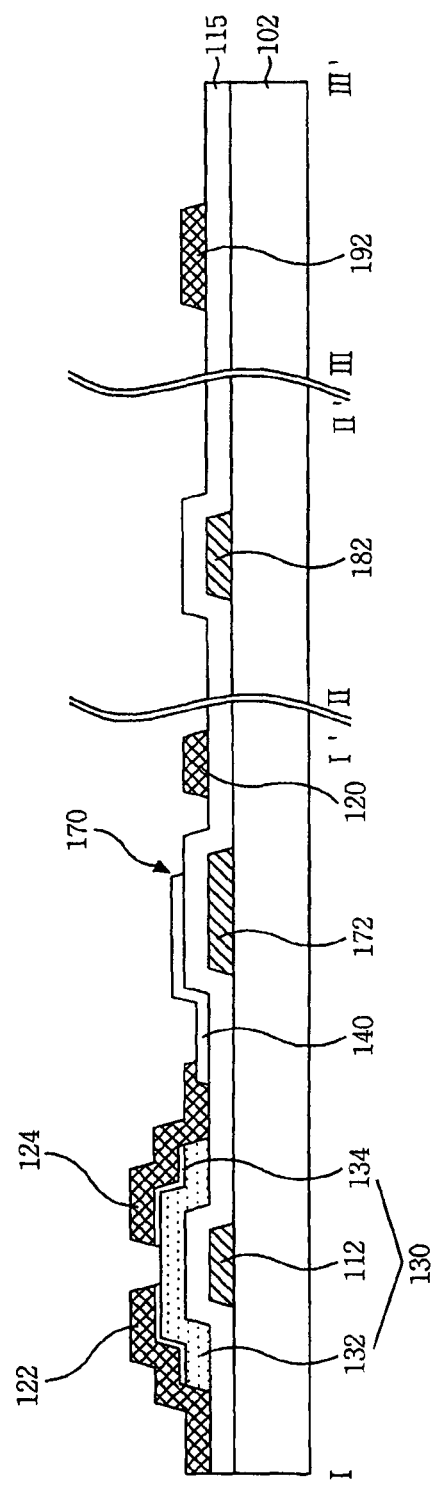

As described above, after forming the semiconductor pattern in the channel area, there is formed a second conductive pattern inclusive of the data line 120, the source electrode 122, the drain electrode 124 and the data pad lower electrode 192 by a fourth mask process as shown in FIGS. 7A and 7B.

Figure 8A:
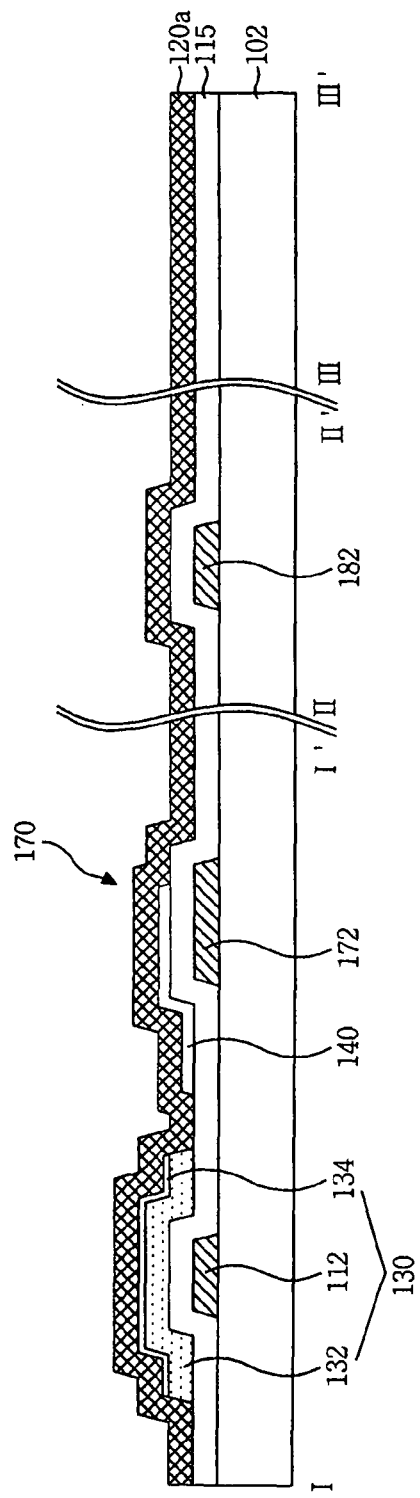
FIGS. 8A and 8E are process diagrams illustrating a process of forming a second conductive pattern according to the present disclosure.
Figure 8B:
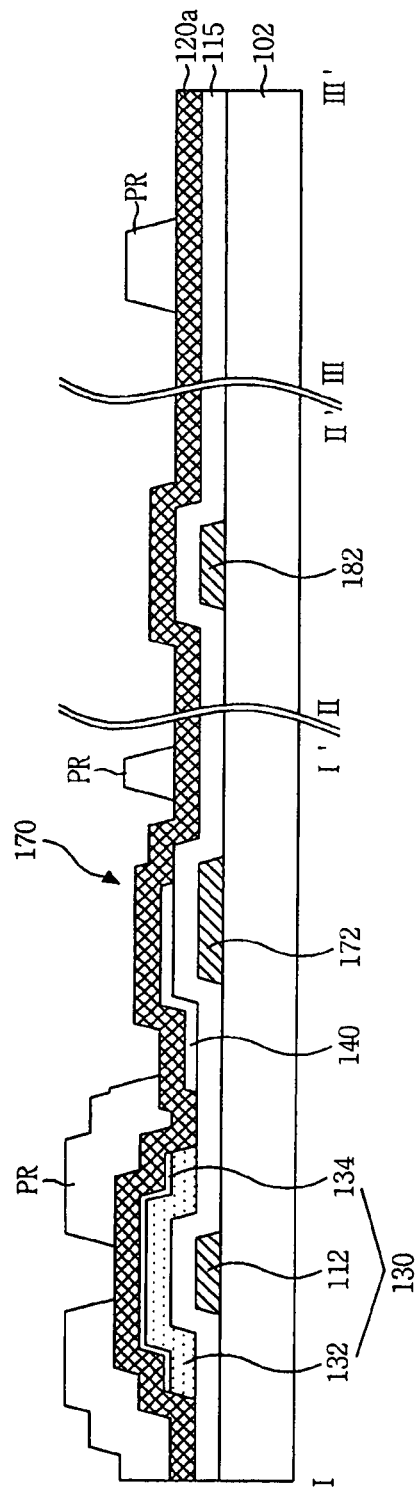

To describe this more specifically, a data metal layer 120A is sequentially deposited on the gate insulating film 115 where the semiconductor pattern 130 is formed, as shown in FIG. 8A. The photo-resist is spread over the entire surface of the data metal layer 120A, and then a photolithography using a fourth mask is carried out to form the photo-resist pattern PR which exposes the data metal layer 120A, as shown in FIG. 8B.

Figure 8C:
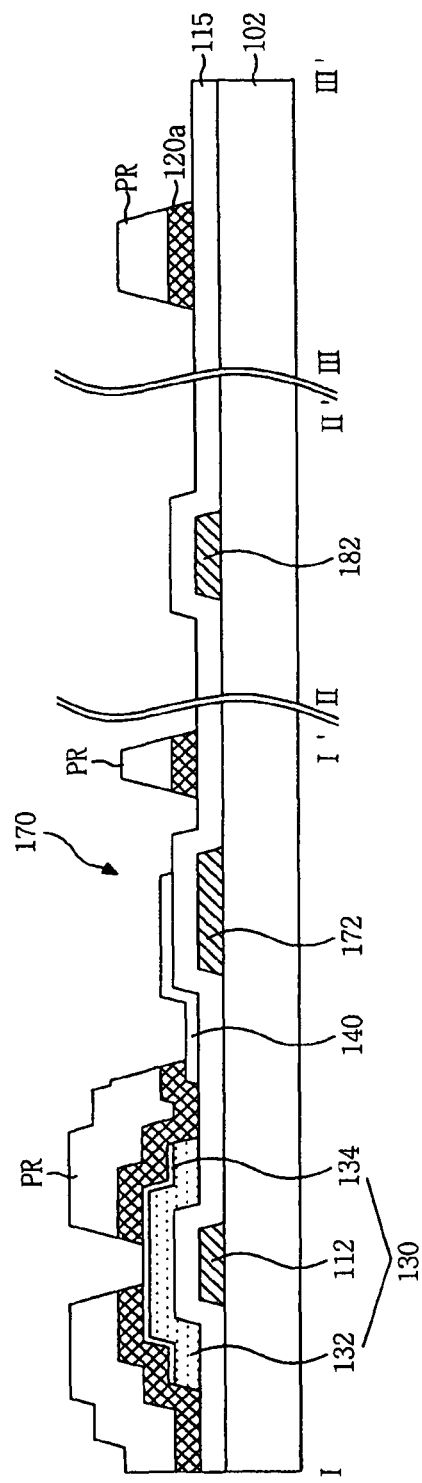

Herein, the photo-resist pattern has a structure that forms a shielding part in an area where the second conductive pattern is formed in the data metal layer 120A and an aperture part is formed in an area other than the channel area. The data metal layer 120A exposed by the photo-resist pattern configured as described above is etched to be removed, thereby separating the data metal layer 120A formed in the channel area of the thin film transistor, as shown in FIG. 8C.

Figure 8D:
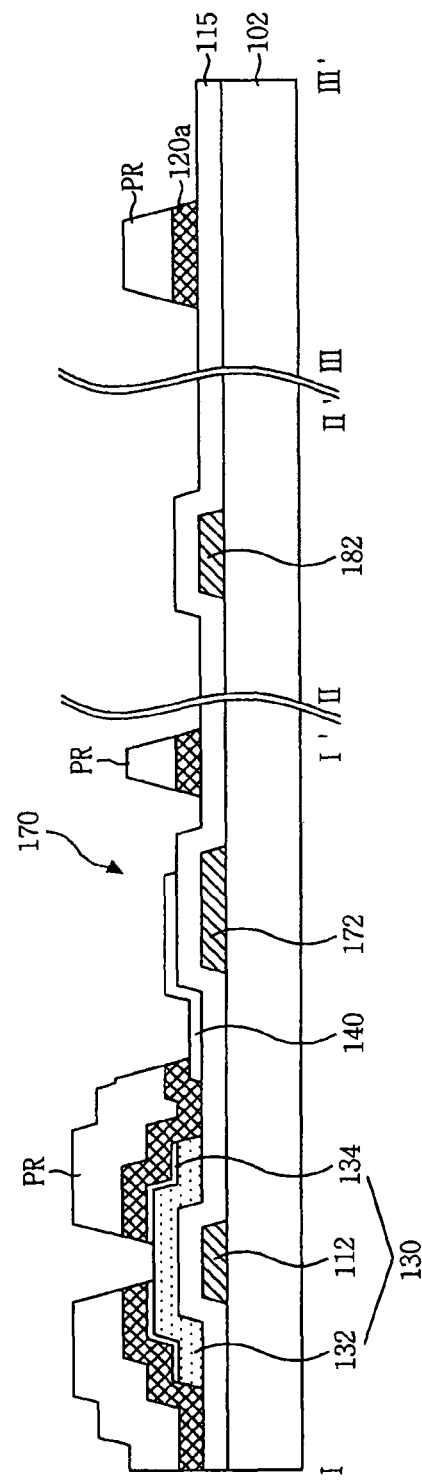
Figure 8E:
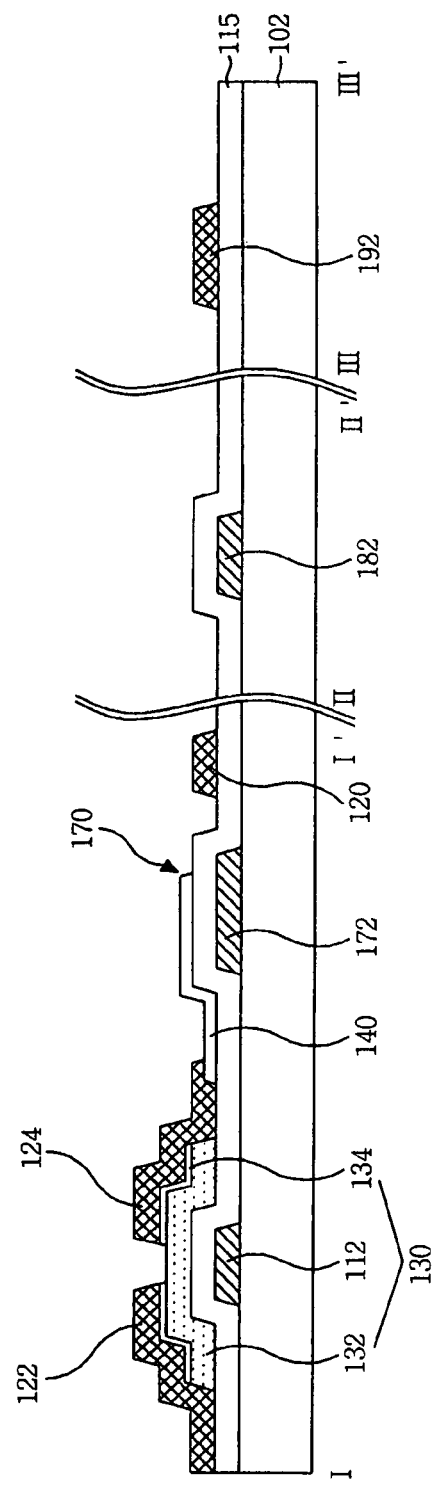

Next, the n+ silicon layer 134A exposed to the channel area as the data metal layer 120A that is separated is removed by a dry etching, thereby forming the semiconductor pattern 130 composed of the active layer 132 which forms the channel of the thin film transistor T and the ohmic contact layer 134, as shown in FIG. 8D.

The photo-resist pattern PR remaining on the data metal layer 120A is removed after forming the semiconductor pattern 130 as described above, thereby forming the second conductive pattern inclusive of the data line 120 which cross the gate line 110 with the gate insulating film 115 therebetween; the source electrode 122 connected to the data line 120; the drain electrode which faces the source electrode 122 with a channel therebetween; and forming the data pad lower electrode 192.

Herein, the thin film transistor T is formed to have various structures, as shown in FIGS. 3A to 3C, but the drain electrode is formed in a structure of partially overlapping the pixel electrode. This is to say, the drain electrode of the thin film transistor is connected in a shape that overlaps the pixel electrode 140, thus the aperture ratio of the pixel area 142 is conspicuously increased in comparison with the thin film transistor having a structure of being projected to the pixel area 142 of the related art.

Figure 9A:
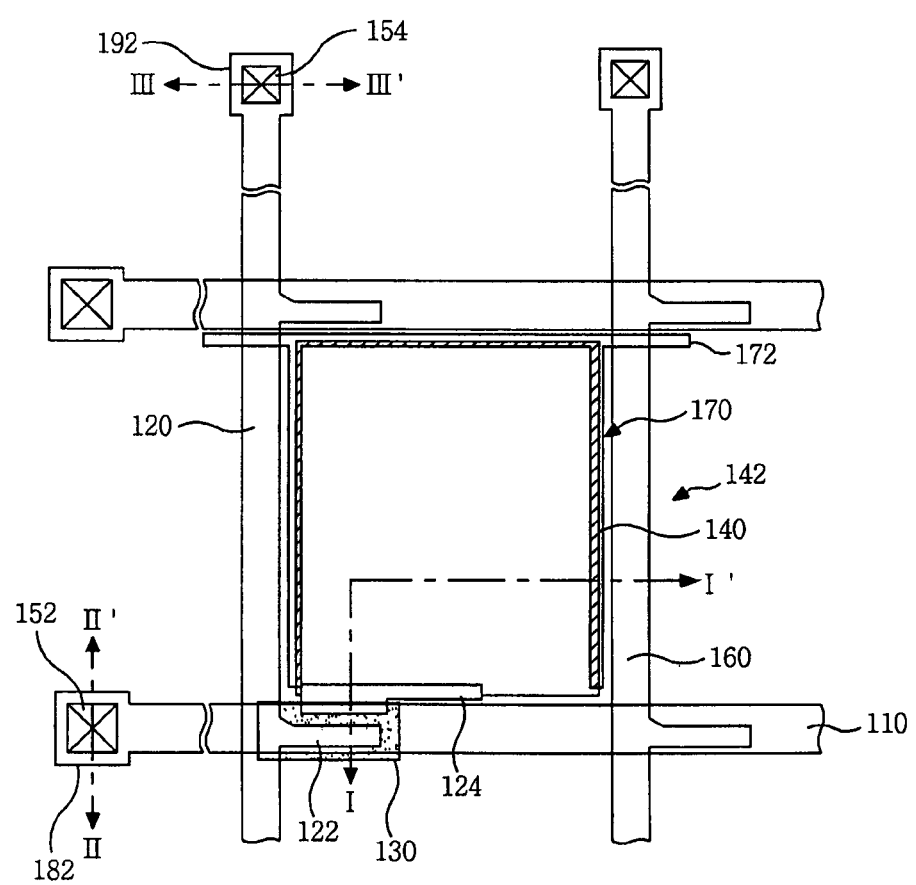
FIGS. 9A and 9B are a plan view and a cross sectional view of a flat panel display panel where a passivation film having a contact hole is formed according to the present disclosure.
Figure 9B:
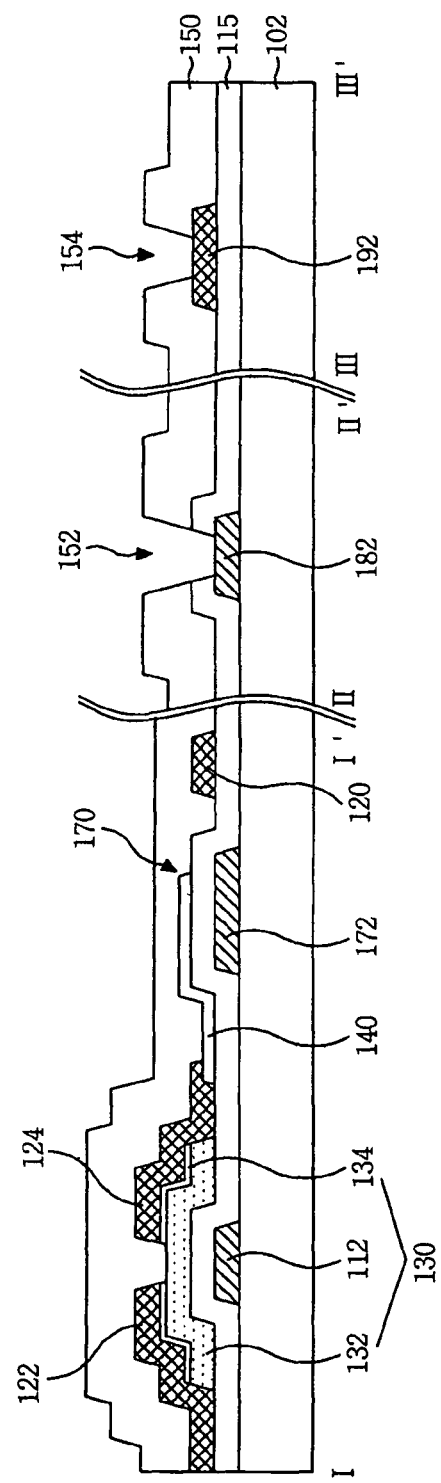

As described above, after the second conductive pattern is formed on the gate insulating film, the passivation film having the contact hole is formed by a fifth mask process according to the present disclosure, as shown in FIGS. 9A and 9B. To describe this more specifically, the passivation film 150 is spread over the entire surface of the gate insulation film 115 where the second conductive pattern is formed.

Next, a photolithography process using a fifth mask is performed after spreading the photo-resist over the surface of the passivation film 150, thereby forming the photo-resist pattern PR which exposes the passivation film 150. The passivation film 150 exposed by the photo-resist pattern PR is etched, thereby finally forming the first contact hole 152 which penetrates the passivation film 150 and the gate insulating film 115 to expose the gate pad lower electrode 182 and the second contact hole 154, which penetrates the passivation film 150 to expose the data pad lower electrode 192.

Herein, the passivation film 150 is formed of an inorganic insulating material such as silicon nitride and the like or an organic insulating material such as BCB (benzocyclobutene), PFCB (perfluorocyclobutane) or an organic compound material such as photo-acryl and the like.

In case the passivation film 150 is formed of the inorganic insulating material such as silicon nitride (dielectric constant is 6.5), the passivation film 150 is formed to have a thickness of not less than 6000 Å in order to prevent a coupling from being generated between the data line 120 and the common electrode 160 which overlap each other.

And, in case the passivation film 150 is formed of the organic compound material such as photo-acryl (dielectric constant is 3.3), the passivation film 150 is desirably formed to have a thickness of not less than 1.5 μm in order to prevent a coupling from being generated between the data line 120 and the common electrode 160 that overlap each other.

Figure 10A:
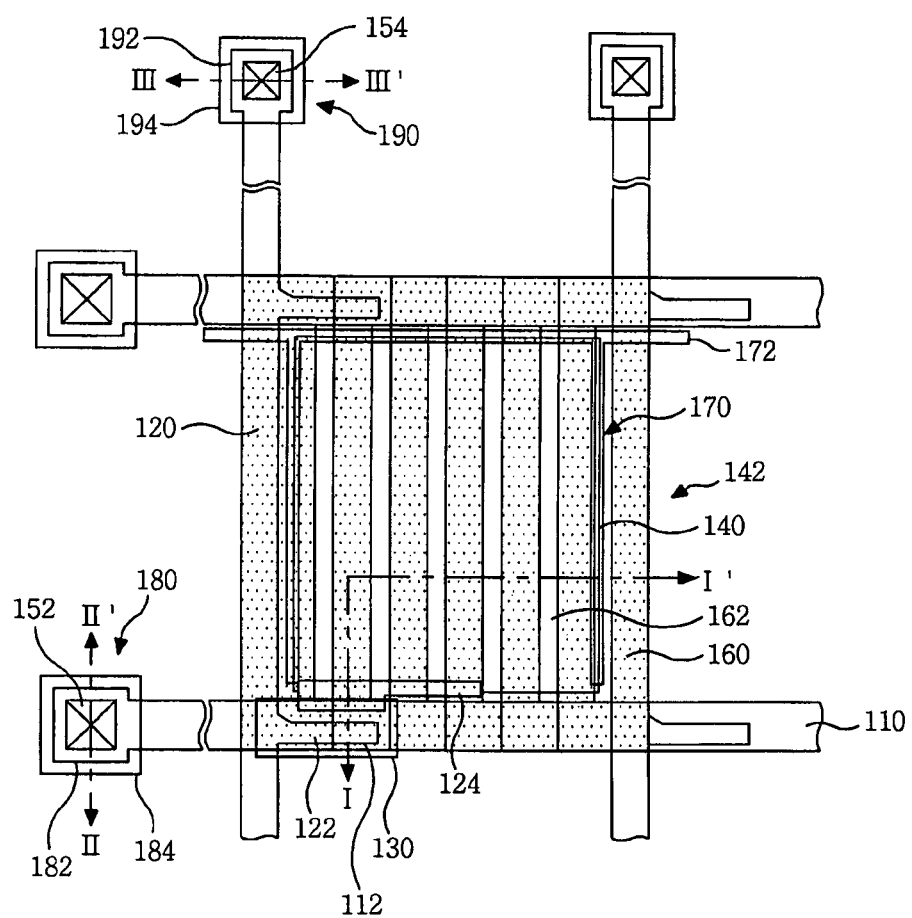
FIGS. 10A and 10B are a plan view and a cross sectional view of a flat panel display panel where a third conductive pattern is formed according to the present disclosure.
Figure 10B:
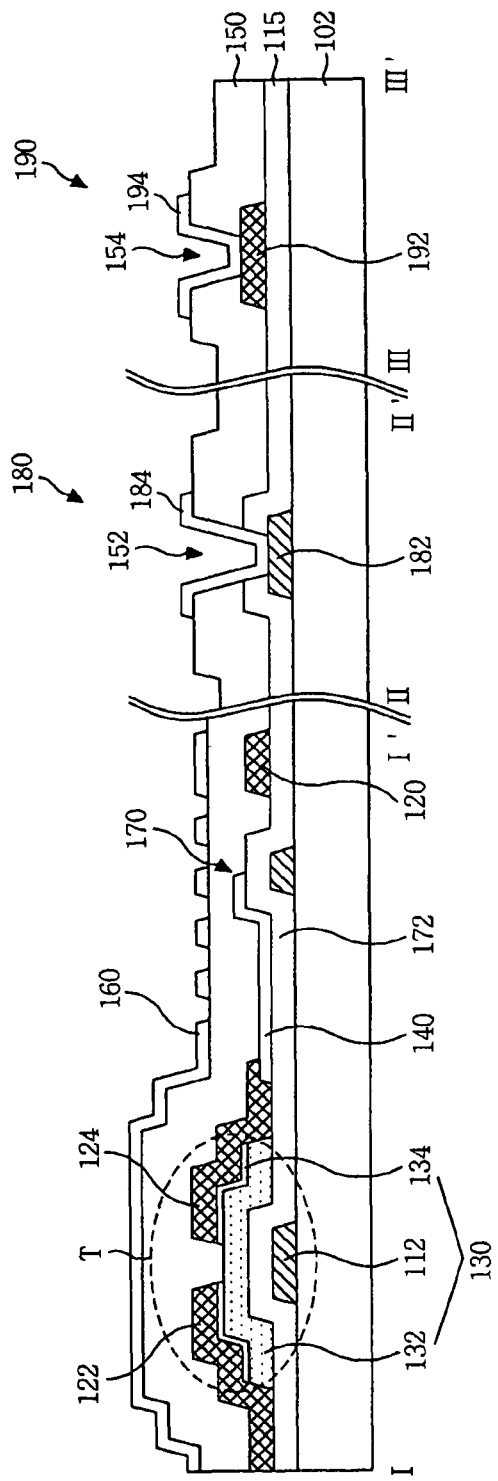

After forming the passivation film having the contact hole as described above, there is formed a third conductive pattern inclusive of the common electrode forming the fringe field on the passivation film; the gate pad upper electrode; and the data pad upper electrode by a sixth mask process, as shown in FIGS. 10A and 10B.

More specifically, the transparent conductive layer is deposited on the entire surface of the passivation film 150 where the contact holes 152, 154 are formed by a deposition process such as PECVD and the like.

Next, a photolithography process using a sixth mask is carried out after spreading the photo-resist over the entire surface of the transparent conductive layer, thereby forming the photo-resist pattern PR that exposes the transparent conductive layer. The remaining photo-resist pattern PR is removed after etching the transparent conductive layer exposed by the photo-resist pattern, thereby forming a third conductive pattern inclusive of the common electrode 160 having the slit 162 which forms the fringe field together with the pixel electrode 140; the gate pad upper electrode 184 connected to the gate pad lower electrode 182 through the first contact hole 152; and the data pad upper electrode 194 connected to the data pad lower electrode 192 through the second contact hole 154.

Herein, the common electrode 160 is formed to overlap the data line 120 and the pixel electrode 140 with the passivation film 150 therebetween. The slit pattern 162 is formed is the pixel area 142 where the fringe field for aligning liquid crystal in a designated direction together with the pixel electrode 140.

The gate pad upper electrode 184 constituting the gate pad 180 is simultaneously formed of the same material as the common electrode 160, and the data pad upper electrode 194 constituting the data pad 190 is simultaneously formed of the same material as the common electrode 160.

As described above, the fringe field type liquid crystal display panel and the fabricating method thereof according to the present disclosure forms the data line and the common electrode to be overlapped with each other, thereby having an effect that the aperture ratio of the pixel area can be increased.

The present disclosure forms the passivation film, which is made of the inorganic and organic insulating film with a designated height, between the pixel electrode and the common electrode, thereby having an effect that the parasitic capacitance between the data line and the common electrode overlapped therewith can be prevented from being generated.

The present disclosure forms the common electrode to cover the channel area of the thin film transistor, thereby having an effect that the leakage current and the off-current can be prevented from be generated in the channel area.

Although the present disclosure has been explained by the embodiments shown in the drawings described above, it should be understood to the ordinary skilled person in the art that the disclosure is not limited to the embodiments, but rather that various changes or modifications thereof are possible without departing from the spirit of the disclosure. Accordingly, the scope of the disclosure shall be determined only by the appended claims and their equivalents.

What is claimed is:

1. A fringe field type liquid crystal display panel, comprising:
    a gate line disposed on a substrate;
    a storage electrode separated from and formed of the same material as the gate line on the substrate,
    a data line disposed to cross the gate line, wherein a gate insulating film is disposed between the gate line and the date line;
    a thin film transistor disposed at an intersection area of the gate line and the data line;
    a pixel electrode directly formed on the gate insulating film and directly-connected to a drain electrode of the thin film transistor, an upper surface of the pixel electrode being directly contacted with a lower surface of the drain electrode;
    a passivation film disposed on the gate insulating film to cover the pixel electrode and the thin film transistor;
    a common electrode disposed to overlap the pixel electrode and the data line on the passivation film to form a fringe field for aligning liquid crystal together with the pixel electrode; and
    a data pad having a data pad lower electrode formed on the substrate and extended from the data line, and a data pad upper electrode formed on the passivation film and contacted with an upper surface of the data pad lower electrode through a first contact hole defined in the passivation film,
    wherein the pixel electrode is formed in a pixel area defined by cross of the gate line and the data line, and the storage electrode includes a horizontal portion in parallel with the gate line to overlap with one edge of the pixel electrode, and a plurality of vertical portions extended from the horizontal portion to overlap with two edges connected to the one edge of the pixel electrode.

2. The fringe field type liquid crystal display panel according to claim 1, wherein the gate insulating film is disposed between the storage electrode and the pixel electrode to form a storage capacitor, the storage capacitor is formed only by the storage electrode and the pixel electrode.

3. The fringe field type liquid crystal display panel according to claim 1, further comprising:
    a gate pad having a gate pad lower electrode connected to the gate line and a gate pad upper electrode connected to the gate pad lower electrode through a second contact hole defined in the passivation film.

4. The fringe field type liquid crystal display panel according to claim 3, wherein the gate pad lower electrode is simultaneously disposed and of the same material as the gate line, and the gate pad upper electrode is simultaneously disposed and of the same material as the common electrode.

5. The fringe field type liquid crystal display panel according to claim 3, wherein the data pad lower electrode is simultaneously disposed and of the same material as the data line, and the data pad upper electrode is simultaneously disposed and of the same material as the common electrode.

6. The fringe field type liquid crystal display panel according to claim 1, wherein the thin film transistor includes:
    a gate electrode connected to the gate line;
    a source electrode connected to the data line;
    the drain electrode which faces the source electrode with a channel therebetween and is directly connected to the pixel electrode at the same time; and
    a semiconductor pattern which is disposed to overlap the gate electrode with the gate insulating film therebetween and which has an ohmic contact layer and an active layer that forms a channel between the source electrode and the drain electrode.

7. The fringe field type liquid crystal display panel according to claim 6, wherein the source electrode is disposed to be projected from the data line, and the drain electrode is disposed in a "ᴦ" shape to face the source electrode with the channel therebetween.

8. The fringe field type liquid crystal display panel according to claim 6, wherein the source electrode is disposed to be projected from the data line, the drain electrode is disposed in a "–" shape to face the source electrode with the channel therebetween, and a "–" shaped channel is disposed between the source electrode and the drain electrode.

9. The fringe field type liquid crystal display panel according to claim 6, wherein the source electrode is disposed in a "U" shape to be projected from the data line, the drain electrode is disposed to face the source electrode with the channel therebetween, and a "U" shaped channel is disposed between the source electrode and the drain electrode.

10. The fringe field type liquid crystal display panel according to claim 6, wherein the source electrode is disposed to be integrated with the data line, and the drain electrode is disposed in a "ᴦ" shape to face the source electrode with the channel therebetween.

11. The fringe field type liquid crystal display panel according to claim 1, wherein the pixel electrode is disposed with a gap of about 0-3.0 μm from the data line 120.

12. The fringe field type liquid crystal display panel according to claim 1, wherein the passivation film comprises an inorganic insulating material of not less than 6000A° in order to prevent a parasitic capacitance from being generated between the common electrode and the drain electrode.

13. The fringe field type liquid crystal display panel according to claim 1, wherein the passivation film comprises an organic insulating material of not less than 1.5 μm in order to prevent a parasitic capacitance from being generated between the common electrode and the drain electrode.

14. The fringe field type liquid crystal display panel according to claim 1, wherein the common electrode is disposed to cover an area where the thin film transistor is disposed.

15. The fringe field type liquid crystal display panel according to claim 1, wherein the common electrode is patterned to have a slit groove where a fringe field is formed together with the pixel electrode.

16. The fringe field type liquid crystal display panel according to claim 1, wherein the common electrode comprises a transparent conductive material such as ITO, IZO or the like.

17. A fabricating method of a fringe field type liquid crystal display panel, comprising the steps of:
forming a gate line on a substrate;
forming a storage electrode separated from and formed of the same material as the gate line on the substrate,
forming a data line which crosses the gate line to define a pixel area, wherein a gate insulating film is disposed between the gate line and the data line;
forming a thin film transistor at an intersection area of the gate line and the data line;
forming a pixel electrode on the gate insulating film to be directly connected to a drain electrode of the thin film transistor, an upper surface of the pixel electrode being directly contacted with a lower surface of the drain electrode;
forming a passivation film on the gate insulating film to cover the pixel electrode and the thin film transistor;
forming a common electrode to overlap the pixel electrode and the data line on the passivation film and to form a fringe field for aligning liquid crystal together with the pixel electrode; and
forming a data pad having a data pad lower electrode formed on the substrate and extended from the data line and a data pad upper electrode formed on the passivation film and contacted with a upper surface of the data pad lower electrode through a first contact hole defined in the passivation
wherein the pixel electrode is formed in a pixel area defined by cross of the gate line and the data line, and the storage electrode includes a horizontal portion in parallel with the gate line to overlap with one edge of the pixel electrode, and a plurality of vertical portions extended from the horizontal portion to overlap with two edges connected to the one edge of the pixel electrode.

18. The fabricating method according to claim 17, wherein the gate insulating film is formed between the storage electrode and the pixel electrode to form a storage capacitor, the storage capacitor is formed only by the storage electrode and the pixel electrode.

19. The fabricating method according to claim 17, further comprising the steps of:
forming a gate pad having a gate pad lower electrode connected to the gate line and a gate pad upper electrode connected to the gate pad lower electrode through a second contact hole defined in the passivation film.

20. The fabricating method according to claim 19, wherein the gate pad lower electrode is simultaneously formed of the same material as the gate line, and the gate pad upper electrode is simultaneously formed of the same material as the common electrode.

21. The fabricating method according to claim 19, wherein the data pad lower electrode is simultaneously formed of the same material as the data line, and the data pad upper electrode is simultaneously formed of the same material as the common electrode.

22. The fabricating method according to claim 17, wherein the thin film transistor includes:
a gate electrode connected to the gate line;
a source electrode connected to the data line;
the drain electrode which faces the source electrode with a channel therebetween and is directly connected to the pixel electrode at the same time; and
a semiconductor pattern which is formed to overlap the gate electrode with the gate insulating film therebetween and which has an ohmic contact layer and an active layer that forms a channel between the source electrode and the drain electrode.

23. The fabricating method according to claim 22, wherein the source electrode is formed to be projected from the data line, and the drain electrode is formed in a "⌐" shape to face the source electrode with the channel therebetween.

24. The fabricating method according to claim 22, wherein the source electrode is formed to be projected from the data line, the drain electrode is formed in a "–" shape to face the source electrode with the channel therebetween, and a "–" shaped channel is formed between the source electrode and the drain electrode.

25. The fabricating method according to claim 22, wherein the source electrode is formed in a "U" shape to be projected from the data line, the drain electrode is formed to face the source electrode with the channel therebetween, and a "U" shaped channel is formed between the source electrode and the drain electrode.

26. The fabricating method according to claim 22, wherein the source electrode is formed to be integrated with the data line, and the drain electrode is formed in a "⌐" shape to face the source electrode with the channel therebetween.

27. The fabricating method according to claim 17, wherein the pixel electrode is formed with a gap of about 0-3.0 μm from the data line 120.

28. The fabricating method according to claim 17, wherein the passivation film is formed of an inorganic insulating material of not less than 6000A° in order to prevent a parasitic capacitance from being generated between the common electrode and the drain electrode.

29. The fabricating method according to claim 17, wherein the passivation film comprises an organic insulating material of not less than 1.5 μm in order to prevent a parasitic capacitance from being generated between the common electrode and the drain electrode.

30. The fabricating method according to claim 17, wherein the common electrode is formed to cover an area where the thin film transistor is formed.

31. The fabricating method according to claim 17, wherein the common electrode is patterned to have a slit groove where a fringe field is formed together with the pixel electrode.

32. The fabricating method according to claim 17, wherein the common electrode comprises a transparent conductive material such as ITO, IZO or the like.

33. A fabricating method of a fringe field type liquid crystal display panel, comprising the steps of:
forming a first conductive pattern having a gate line, a gate electrode and a gate pad lower electrode, which are connected to the gate line, and the storage electrode on a substrate;
forming a gate insulating film which covers the substrate where the first conductive pattern is formed;
forming a pixel electrode which forms a fringe field on the gate insulating film;
forming a semiconductor layer comprising an ohmic contact layer and an active layer, which forms a channel, on the gate insulating film where the pixel electrode is formed;
forming a second conductive pattern having a data line, which crosses the gate line on the gate insulating film to define a pixel area, a source electrode connected to the data line, a drain electrode formed to face the source electrode with a channel therebetween, and a data pad lower electrode, and a semiconductor pattern having the ohmic contact layer and the active layer which forms the channel;

forming a passivation film having a first and a second contact holes to cover the insulating film where the semiconductor pattern and the second conductive pattern are formed; and forming a common electrode, a gate pad upper electrode and a data pad upper electrode on the passivation film, the common electrode being overlapped with the pixel electrode and the data line to form a fringe field, the gate pad upper electrode being connected with the gate pad lower electrode through the first contact hole, and the data pad upper electrode being contacted with an upper surface of the data pad lower electrode formed on the substrate and extended from the data line through the second contact hole defined in the passivation film, wherein the pixel electrode is directly formed on the gate insulating film to be directly connected to the drain electrode of the thin film transistor, an upper surface of the pixel electrode being directly contacted with a lower surface of the drain electrode, wherein the pixel electrode is formed in a pixel area defined by cross of the gate line and the data line, and wherein the storage electrode is separated from and formed of the same material as the gate line, and includes a horizontal portion in parallel with the gate line to overlap with one edge of the pixel electrode, and a plurality of vertical portions extended from the horizontal portion to overlap with two edges connected to the one edge of the pixel electrode.

34. The fabricating method according to claim 33, wherein the gate insulating film is formed between the storage electrode and the pixel electrode to form a storage capacitor, the storage capacitor is formed only by the storage electrode and the pixel electrode.

35. The fabricating method according to claim 33, wherein forming the first conductive pattern includes the steps of:
forming a gate metal layer on the entire surface of the substrate;
forming a photo-resist pattern which exposes a remaining area except an area where the first conductive pattern is to be formed after forming a photo-resist on the surface of the gate metal layer; and
forming the first conductive pattern by etching the gate metal layer exposed by the photo-resist pattern.

36. The fabricating method according to claim 33, wherein forming the second conductive pattern includes the steps of:
forming a data metal layer on the surface of the gate insulating film where the semiconductor layer is formed;
forming a photo-resist pattern having a stepped difference in the channel area by a designated mask process after forming a photo-resist on the entire surface of the data metal layer;
sequentially etching the data metal layer exposed by the photo-resist pattern and the semiconductor layer having the active layer and the ohmic contact layer;
forming a source electrode and a drain electrode which face each other with the channel area therebetween and which are connected to the data line by etching the exposed data metal layer after exposing the data metal layer formed in the channel area by ashing the photo-resist pattern; and
exposing the active layer, which forms a channel, by etching the ohmic contact layer exposed in the channel area as the source and the drain electrodes are separated.

37. The fabricating method according to claim 36, wherein the source electrode is formed to be projected from the data line, and the drain electrode is formed in a "ㄲ" shape to face the source electrode with the channel therebetween and to be directly connected to the pixel electrode at the same time.

38. The fabricating method according to claim 36, wherein the source electrode is formed to be projected from the data line, the drain electrode is formed in a "–" shape to face the source electrode with the channel therebetween and to be directly connected to the pixel electrode at the same time, and a "–" shaped channel is formed between the source electrode and the drain electrode.

39. The fabricating method according to claim 36, wherein the source electrode is formed in a "U" shape to be projected from the data line, the drain electrode is formed to face the source electrode with the channel therebetween, and a "U" shaped channel is formed between the source electrode and the drain electrode.

40. The fabricating method according to claim 36, wherein the source electrode is formed to be integrated with the data line, and the drain electrode is formed in a "ㄲ" shape to face the source electrode with the channel therebetween and to be directly connected to the pixel electrode at the same time.

41. The fabricating method according to claim 33, wherein the pixel electrode is formed with a gap of about 0-3.0 μm from the data line 120.

42. The fabricating method according to claim 33, wherein forming the passivation film includes the steps of:
forming the passivation film which covers the second conductive pattern on the gate insulating film;
forming a photo-resist pattern which exposes areas where the first and second contact holes are to be defined by a designated mask process after forming a photo-resist on the surface of the passivation film; and
defining the first contact hole which exposes the gate pad lower electrode and the second contact hole which exposes the data pad lower electrode by etching an area exposed by the photo-resist pattern.

43. The fabricating method according to claim 42, wherein the passivation film is formed of an inorganic insulating material of not less than 6000A° in order to prevent a parasitic capacitance from being generated between the common electrode and the drain electrode.

44. The fabricating method according to claim 42, wherein the passivation film comprises an organic insulating material of not less than 1.5μm on in order to prevent a parasitic capacitance from being generated between the common electrode and the drain electrode.

45. The fabricating method according to claim 33, wherein the common electrode comprises a transparent conductive material such as ITO, IZO or the like.

* * * * *

UNITED STATES PATENT AND TRADEMARK OFFICE
CERTIFICATE OF CORRECTION

PATENT NO.       : 8,670,098 B2                               Page 1 of 1
APPLICATION NO.  : 11/960325
DATED            : March 11, 2014
INVENTOR(S)      : Daelim Park et al.

It is certified that error appears in the above-identified patent and that said Letters Patent is hereby corrected as shown below:

In the Claims

In column 11, claim 17, line 32, after "passivation" insert --film;--.

Signed and Sealed this
Sixteenth Day of September, 2014

Michelle K. Lee
*Deputy Director of the United States Patent and Trademark Office*